J. L. PENNOCK.
Chills for Puddling Furnaces.

No. 161,268.  Patented March 23, 1875.

Witnesses
Harry Smith
Hubert Howson

J. L. Pennock
By his attys,
Howson & Son

UNITED STATES PATENT OFFICE.

JOSEPH L. PENNOCK, OF COATESVILLE, PENNSYLVANIA.

IMPROVEMENT IN CHILLS FOR PUDDLING-FURNACES.

Specification forming part of Letters Patent No. 161,268, dated March 23, 1875; application filed March 4, 1875.

*To all whom it may concern:*

Be it known that I, JOSEPH L. PENNOCK, of Coatesville, Pennsylvania, have invented certain Improvements in Furnaces, of which the following is a specification:

My invention relates to an improvement in the invention for which Letters Patent were granted to me on the 14th day of July, 1874, the object of my improvement being to more effectually maintain the integrity of puddling-furnaces than usual, and to economize the consumption of the refractory ore or fix usually employed as a lining for puddling-furnaces.

Figure 1:
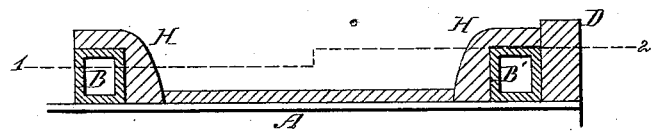
Figure 2:
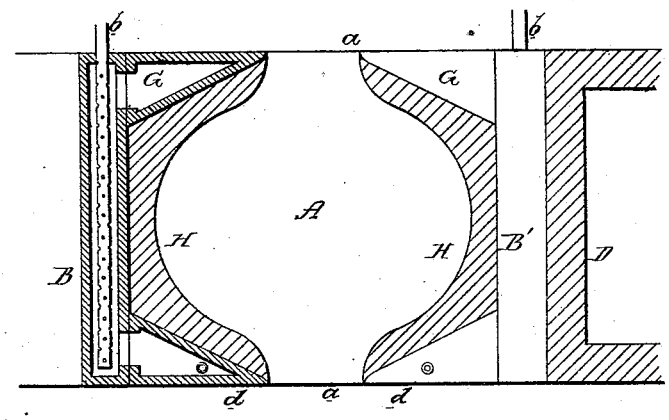

Figure 1 of the accompanying drawing represents a vertical section of the bed of a puddling-furnace with improvement, and Fig. 2 a sectional plan on the line 1 2, Fig. 1.

A is a cast-iron plate, which, as usual, supports the bed of the furnace; and B and B' are two hollow cast-iron chills extending entirely across the bed, as shown in Fig. 2, the chill being situated directly behind the bridge-wall D. On opposite sides of the furnace are the usual doorways *a a*, toward which are directed the tapering ends of the hollow cast-iron cheeks G, the latter, although cast separately from the chills, communicating freely therewith, as shown in Fig. 2. Steam-pipes *b* communicate with the chills, so that live steam may at all times pervade the interior of both the chills and the cheeks, there being outlets at *d* for the escape of the steam. There may be in one end of each chill an opening larger than the pipe *b*, which projects into the chill, so that air may enter the same with the steam. H represents the refractory lining technically termed the "fix," which is banked up against the side and over the top of each chill, as shown in Fig. 1.

The above description will apply to the improvement described in my former patent, in which, however, the steam was simply permitted to enter the chill at one end of the same. I have found that a much better preservation of the integrity of the chills and the durability of the fix H can be attained if the steam-pipes are permitted to enter the chills, as shown in Fig. 2 of the drawing, and if that portion of each pipe which is contained within each chill be perforated, so that forcible jets of steam may be directed against the sides, top, and bottom of the said chill.

I claim as my invention—

The combination, in a puddling-furnace, of the within-described chills and cheeks with perforated steam-pipes, as set forth.

In testimony whereof I have signed my name to this specification in the presence of two subscribing witnesses.

JOSEPH L. PENNOCK.

Witnesses:
JACOB GARMAN,
WILL H. KOONS.